(12) United States Patent
Watarai et al.

(10) Patent No.: US 8,662,258 B2
(45) Date of Patent: Mar. 4, 2014

(54) BICYCLE HAVING BRAKE WITH QUICK RELEASE MECHANISM

(75) Inventors: Etsuyoshi Watarai, Osaka (JP); Osamu Kariyama, Osaka (JP); Masahiro Nakakura, Osaka (JP)

(73) Assignee: Shimano Inc., Osaka (JP)

( * ) Notice: Subject to any disclaimer, the term of this patent is extended or adjusted under 35 U.S.C. 154(b) by 161 days.

(21) Appl. No.: 13/422,665

(22) Filed: Mar. 16, 2012

(65) Prior Publication Data

US 2012/0248732 A1   Oct. 4, 2012

(30) Foreign Application Priority Data

Mar. 31, 2011   (JP) .................................. 2011-080693

(51) Int. Cl.
*B62L 3/00* (2006.01)

(52) U.S. Cl.
USPC ..................................... 188/24.12; 188/24.22

(58) Field of Classification Search
USPC ................... 188/24.11–24.22, 26; 192/217.1; 74/594.2
See application file for complete search history.

(56) References Cited

U.S. PATENT DOCUMENTS

| | | | | |
|---|---|---|---|---|
| 4,030,774 A | * | 6/1977 | Foster | ............................ 280/261 |
| 4,260,044 A | * | 4/1981 | Foster | ......................... 192/217.1 |
| 4,462,488 A | * | 7/1984 | Boyd | .......................... 192/217.1 |
| 4,718,521 A | | 1/1988 | Hosokawa | |
| 7,419,034 B1 | | 9/2008 | Wu | |
| 2009/0078512 A1 | | 3/2009 | Edwards et al. | |

FOREIGN PATENT DOCUMENTS

| | | |
|---|---|---|
| AT | 174825 B | 5/1953 |
| DE | 85 28 246 U1 | 11/1985 |
| EP | 2 275 334 A2 | 1/2011 |
| GB | 2 145 484 A | 3/1985 |
| JP | 52-37342 A | 3/1977 |
| JP | 64-7119 Y2 | 2/1989 |
| JP | 1-107690 U | 7/1989 |
| JP | 1-275294 A | 11/1989 |
| JP | 1-172993 U | 12/1989 |
| JP | 3-5289 A | 1/1991 |
| JP | 4-11193 U | 1/1992 |
| JP | 4111280 B2 | 4/2008 |

OTHER PUBLICATIONS

European Search Report of corresponding EP Application No. 12 16 2344.1 dated Jun. 5, 2012.

* cited by examiner

*Primary Examiner* — Christopher Schwartz
(74) *Attorney, Agent, or Firm* — Global IP Counselors (57) ABSTRACT

A bicycle is provided with a frame, a drive member and a bicycle brake. The drive member is movably mounted to the frame for driving the bicycle. The bicycle brake is mounted to the frame. The bicycle brake includes a quick release mechanism that has an operating part and a contact part. The operating part is operatively arranged to be toggled between a closed position and a released position that is separated from the closed position. The contact part is provided on the operating part and configured such that the operating part contacts the drive member while the operating part is positioned at the released position. The contact part is configured such that after the contact part contacts the drive member due to operation of the drive member, the operating part is then moved from the released position to the closed position.

10 Claims, 10 Drawing Sheets

BICYCLE HAVING BRAKE WITH QUICK RELEASE MECHANISM

CROSS-REFERENCE TO RELATED APPLICATIONS

This application claims priority under 35 U.S.C. §119 to Japanese Patent Application No. 2011-080693, filed Mar. 31, 2011. The entire disclosure of Japanese Patent Application No. 2011-080693 is hereby incorporated herein by reference.

BACKGROUND

1. Field of the Invention

This invention generally relates to a quick release mechanism. More specifically, the present invention relates to a quick release mechanism for a bicycle brake.

2. Background Information

Rim brakes for bicycles are often provided with a quick release mechanism for slightly spreading the brake arms of the rim brake when a wheel will be removed or attached (e.g., see Japanese Examined Utility Model Application Publication No. 64-7119). Japanese Examined Utility Model Application Publication No. 64-7119 discloses a side-pull caliper type rim brake that has a quick release mechanism. A conventional quick release mechanism is configured to slightly open the brake arms by moving an outer casing of a brake cable in a release direction with respect to an inner cable. An operating part is used to accomplish this movement by pivoting the brake arms between a released position in which the brake arms are open and a closed position in which the brake arms are closed. Meanwhile, in recent years, it is becoming common to install a rear rim brake on a chain stay (e.g., see Japanese Laid-Open Patent Publication No. 3-5289).

SUMMARY

Conventionally, a rim brake having a quick release mechanism has been installed in position where a rider can visually check the state of the quick release mechanism and, thus, can easily determine if the operating part has been returned to a closed state. However, when a rim brake having a quick release mechanism is installed on a chain stay, it is difficult to visually check if the operating part has been returned to the closed position.

One object presented in this present disclosure is to provide a quick release mechanism for a bicycle brake in which an operating part of the quick release mechanism can be reliably returned to a closed position even if a user forgets to return the operating part to the closed position.

In view of the state of the known technology, a bicycle according to a first aspect comprises a frame, a drive member and a bicycle brake. The drive member is movably mounted to the frame for driving the bicycle. The bicycle brake is mounted to the frame. The bicycle brake includes a quick release mechanism that has an operating part and a contact part. The operating part is operatively arranged to be toggled between a closed position and a released position that is separated from the closed position. The contact part is provided on the operating part and configured such that the operating part contacts the drive member while the operating part is positioned at the released position. The contact part is configured such that after the contact part contacts the drive member due to operation of the drive member, the operating part is then moved from the released position to the closed position.

With this bicycle, the contact part provided on the operating part contacts the drive member when the operating part is in the released position. After the contact part contacts the drive member, an operation of the drive member causes the operating part to move from the released position to the closed position. Consequently, even if the operating part is in the released position, the contact part will contact the drive member and the operating part will be moved to the closed position when the drive member operates. Thus, even if a user forgets to return the operating part to the closed position, the operating part can be arranged in the closed position in a reliable fashion.

A bicycle brake quick release mechanism according to a second aspect is provided according to the first aspect, wherein the drive member includes a crank arm that is configured to contact the contact part of the quick release mechanism while the operating part is positioned at the released position. With this aspect, if the operating part is in the released position, then the operating part is returned to the closed position by the crank arm of the bicycle when the crank arm is rotated.

A bicycle brake quick release mechanism according to a third aspect is provided according to the second aspect, wherein the crank arm includes a cam surface that is positioned relative the contact part of the quick release mechanism such that the cam surface contacts the contact part and moves the operating part from the released position to the closed position as the crank arm rotates relative to the frame. With this aspect, the cam surface provided on the crank arm contacts the contact part and causes the operating part to return from the released position to the closed position.

A bicycle brake quick release mechanism according to a fourth aspect is provided according to the second aspect, wherein the contact part of the quick release mechanism includes a cam surface that is positioned relative the crank arm such that the cam surface contacts the crank arm and moves the operating part from the released position to the closed position as the crank arm rotates relative to the frame. With this aspect, the crank arm contacts the cam surface provided on the contact part and causes the operating part to return from the released position to the closed position.

A bicycle brake quick release mechanism according to a fifth aspect is provided according to the first aspect, wherein the drive member includes a chain that is configured to contact the contact part of the quick release mechanism while the operating part is positioned at the released position. With this aspect, if the operating part is in the released position, then the operating part is returned to the closed position by the chain when the bicycle is pedaled.

A bicycle brake quick release mechanism according to a sixth aspect is provided according to any one of the first to fifth aspects, wherein the operating part rotatably disposed on a brake arm of the bicycle brake. The quick release mechanism further includes a biasing member that exerts a force against the operating part to selectively hold the operating part in the released position and the closed position. Since the biasing member exerts forces against the operating part toward both the closed position and the released position, the operating part can be moved returned to the closed position by the biasing member when the operating part is merely moved from the released position toward the closed position beyond a division position (e.g., a dead point of the biasing member). Also, operating part can be held in the closed position or the released position by the biasing member.

With the present invention, if the operating part is in the released position, then when the drive member operates, the drive member will contact the contact part and cause the operating part to be moved to the closed position. Thus, even if a user forgets to return the operating part to the closed position, the operating part can be arranged in the closed position in a reliable fashion.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
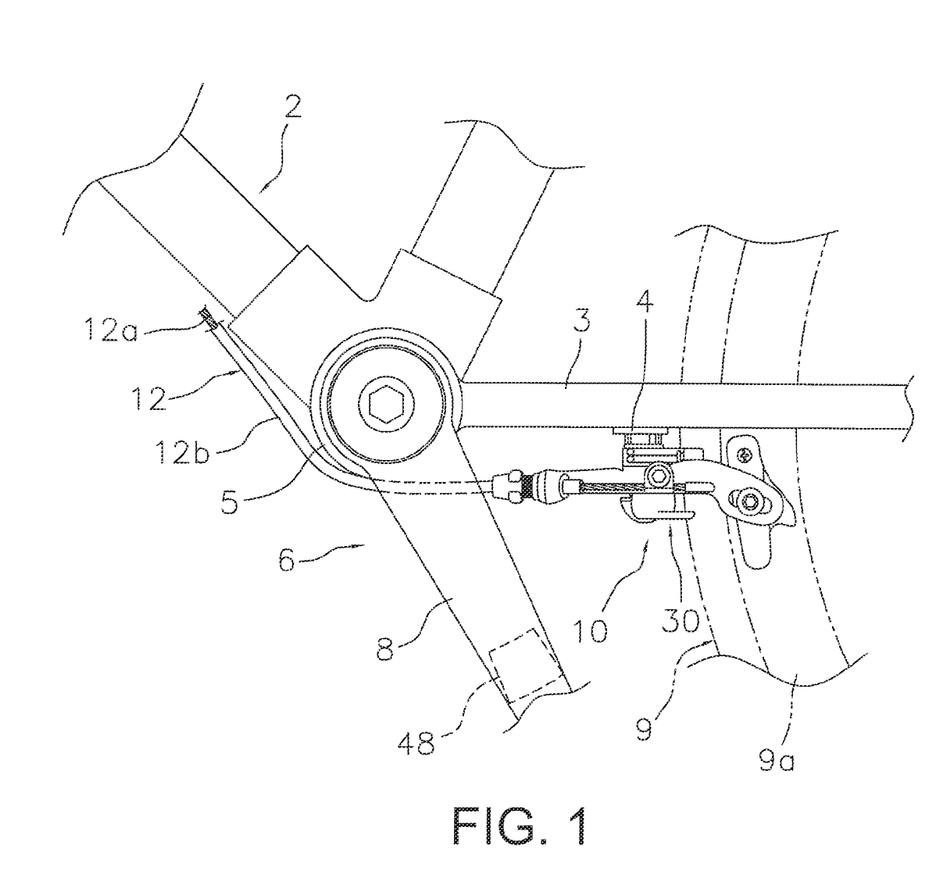
FIG. 1 is a partial side elevational view of a bicycle that is equipped with a caliper brake having a bicycle brake quick release mechanism in accordance with a first embodiment shown in an installed position.
Figure 2:
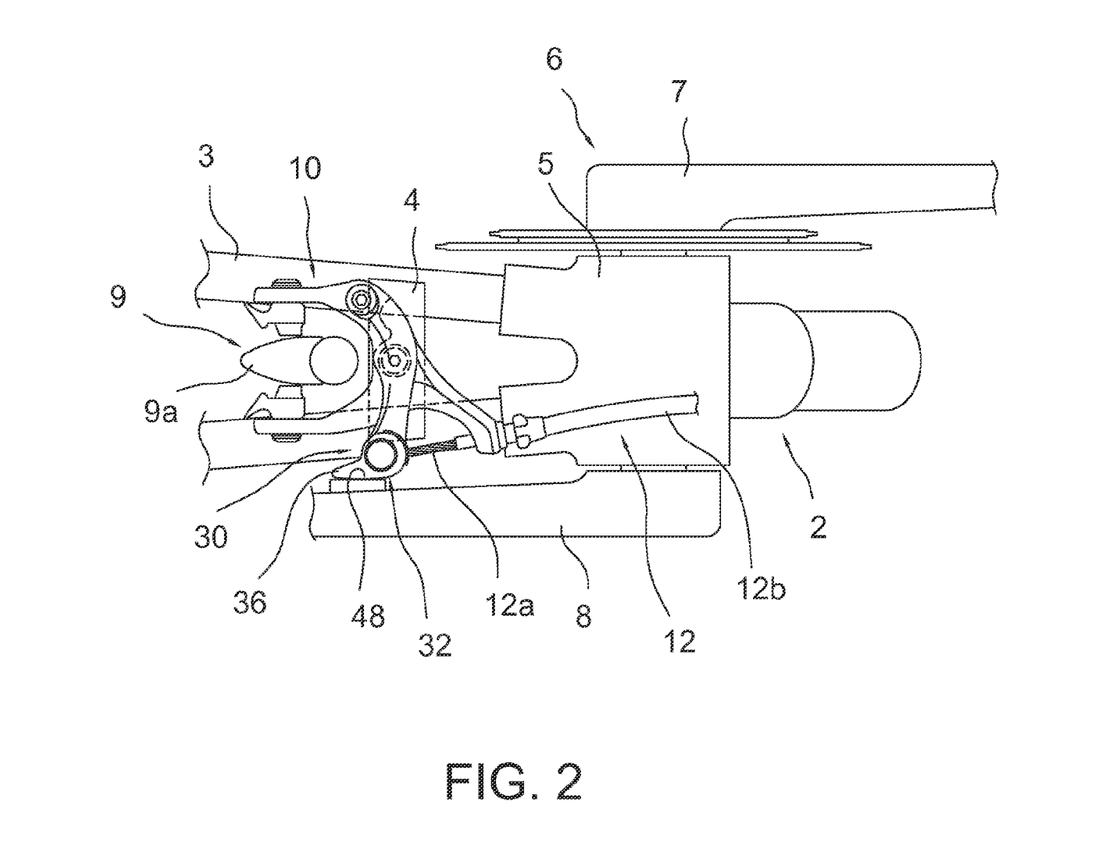
FIG. 2 is a bottom plan view of the portion of the bicycle having the caliper brake as illustrated in FIG. 1 shown in an installed position.

Referring initially to FIGS. 1 and 2, a portion of a bicycle frame 2 is illustrated with a chain stay 3 having a bicycle brake 10 in accordance with a first embodiment. The bicycle brake 10 is a side pull caliper type rim brake that is configured to slow or stop rotation of a wheel of a bicycle by pinching a rim of the wheel. In the first embodiment, the caliper brake 10 is arranged to slow or stop rotation of the bicycle wheel by pinching a rim 9a of a rear wheel 9 of the bicycle. The caliper brake 10 is attached to a coupling member 4 fastened to the chain stay 3. The coupling member 4 is arranged rearward of a hanger tube 5 of the bicycle frame 2. A crank assembly 6 is rotatably installed in the hanger tube 5. The crank assembly 6 has a gear crank 7 (FIG. 2) and a left crank 8. The crank assembly 6 is also provided with pedals (not shown) are mounted to tip ends of the gear crank 7 and the left crank 8. The left crank 8 is an example of a drive member. The crank assembly 6 is part of a bicycle drive train that also includes one or more front sprockets, one or more rear sprockets and a chain. Each part of the bicycle drive train that moves while the rider is pedaling the bicycle can constitute a drive member. A brake cable 12 connects the caliper brake 10 to a brake lever (not shown) mounted to a handlebar.

Figure 3A:
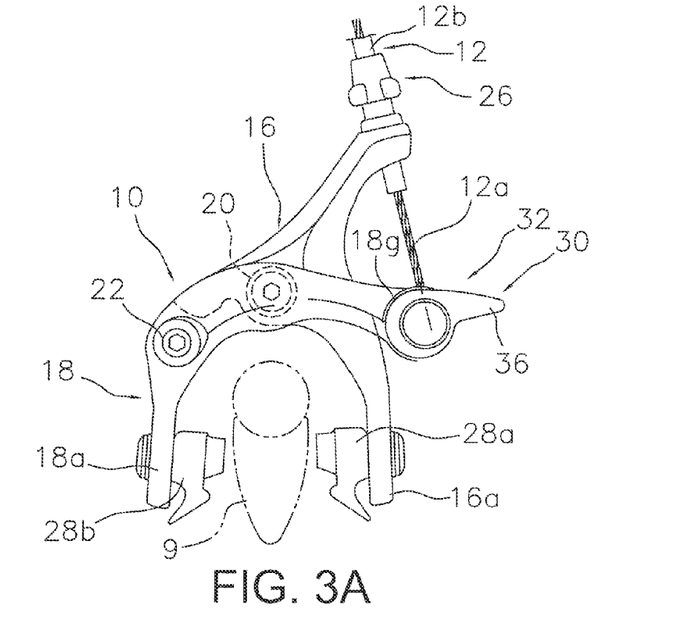
FIG. 3A is a front elevational view of the caliper brake with an operating part in the released position in accordance with the first embodiment.
Figure 3B:
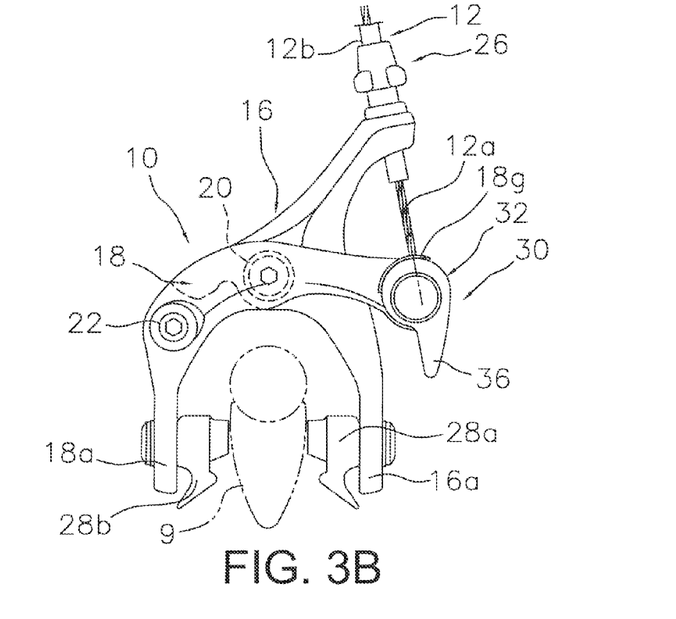
FIG. 3B is a front elevational view of the caliper brake with the operating part in the closed position in accordance with the first embodiment.
Figure 4:
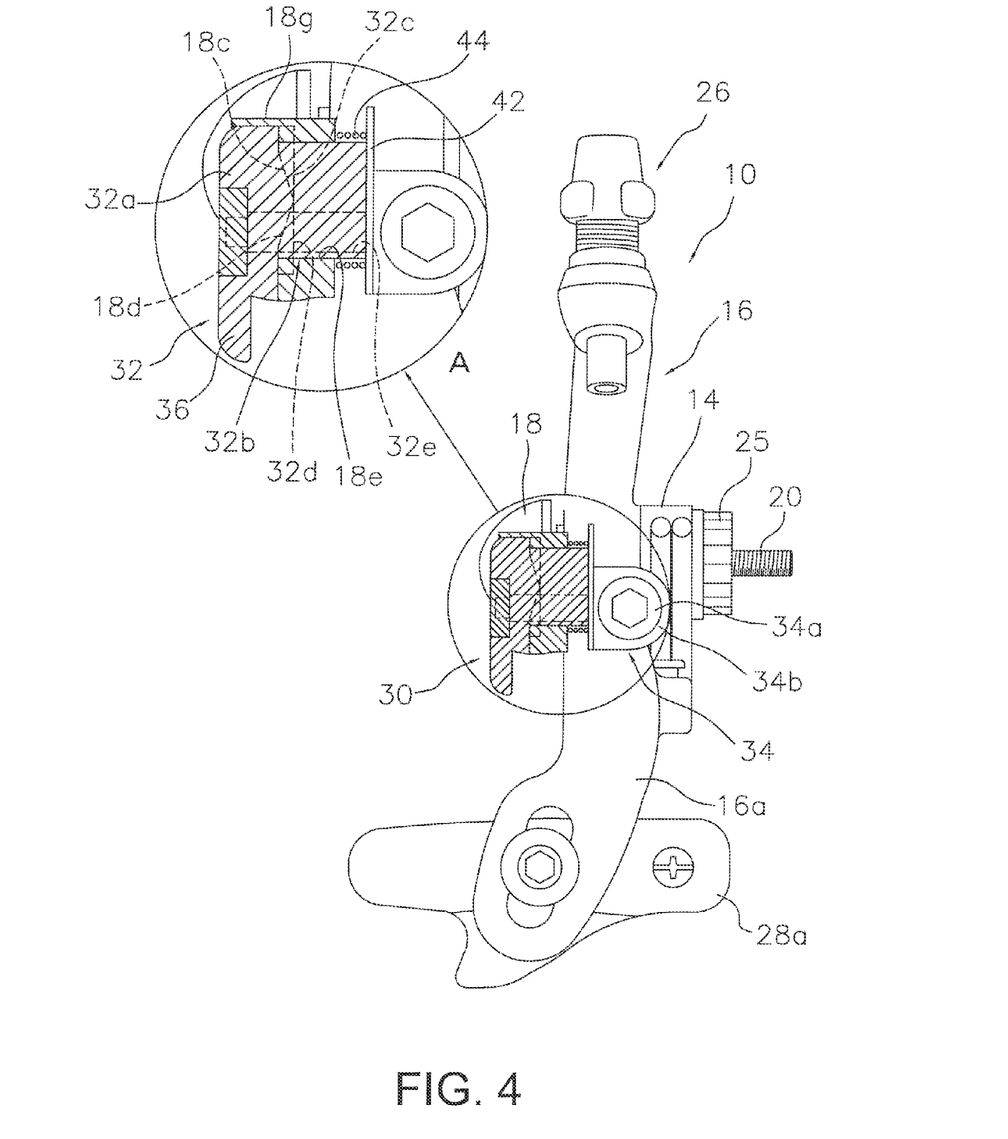
FIG. 4 is a right side elevational view of the caliper brake illustrated in FIGS. 3A and 3B, with a portion shown in cross section.
Figure 5:
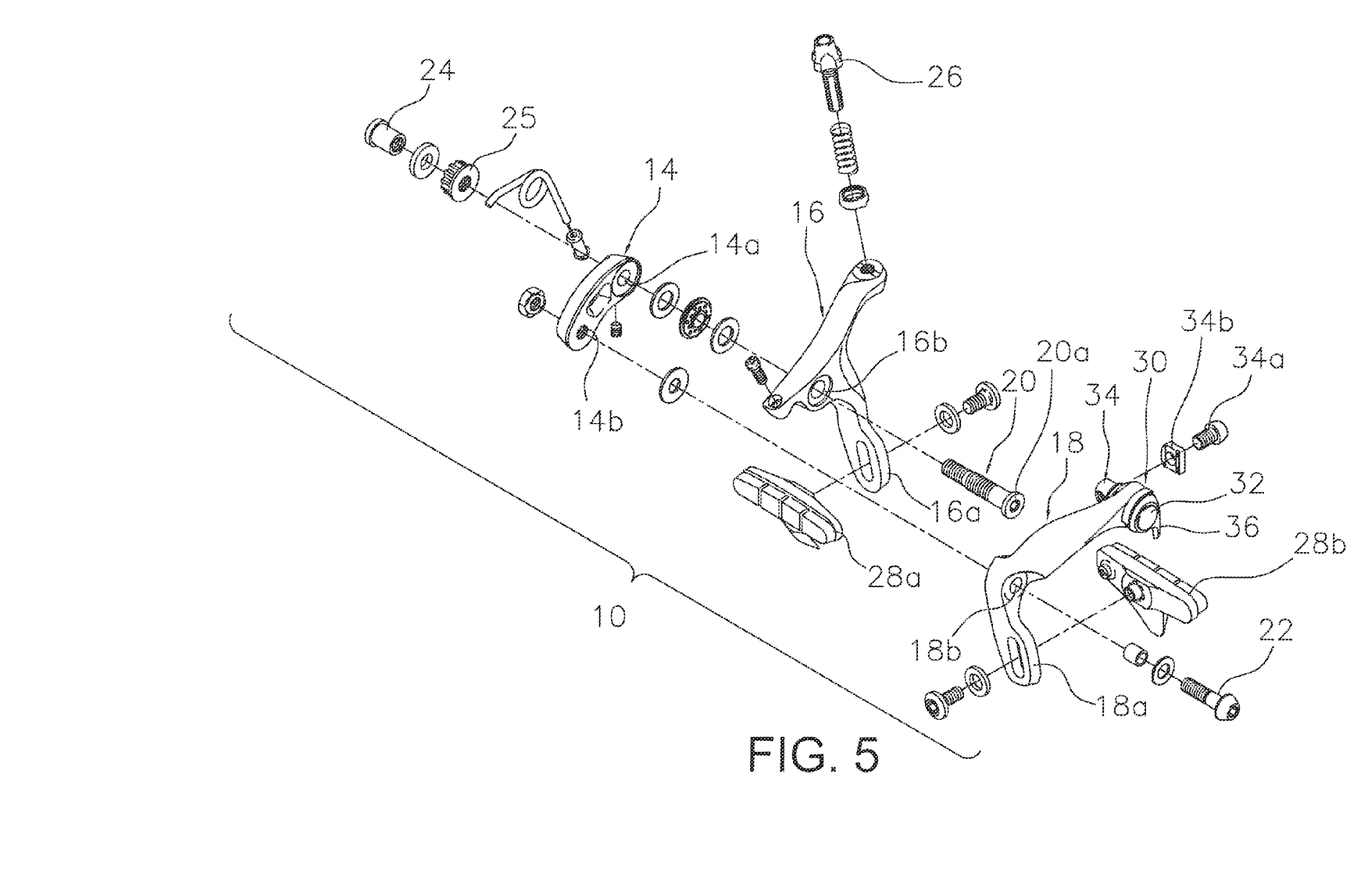
FIG. 5 is an exploded perspective view of the caliper brake illustrated in FIGS. 3A, 3B and 4.

As shown in FIGS. 3A, 3B, 4 and 5, the caliper brake 10 has a bracket 14, a first brake arm 16 and a second brake arm 18. The first and second brake arms 16 and 18 are pivotally connected to the bracket 14. As shown in FIG. 5, the bracket 14 is a member that is curved in a circular arc-like shape. The bracket 14 has a first through hole 14a provided in a first end and a second through hole 14b provided in a second end. The first through hole 14a is configured such that a first pivot shaft 20 serving to pivotally support the first brake arm 16 can pass through. The second through hole 14b is configured such that a second pivot shaft 22 serving to pivotally support the second brake arm 18 can pass through. The bracket 14 is fastened to the coupling member 4 with a first nut member 24 that is screwed onto a tip end of the first pivot shaft 20.

The first brake arm 16 is a generally diagonal T-shaped member. An outer casing stop 26 is attached to an upper end of the first brake arm 16 for securing an outer casing 12b of the brake cable 12. A first shoe mounting section 16a is provided on a lower end of the first brake arm 16 for fastening a first brake shoe 28a. The first shoe mounting section 16a has an elongated hole that enables a position of the first brake shoe 28a to be adjusted. A first shaft mounting section 16b is formed near an intersection portion of the T-shaped first brake arm 16. The first shaft mounting section 16b is configured to enable the first pivot shaft 20 to pass there-through and to house a head section 20a of the first pivot shaft 20. The first brake arm 16 is secured to the bracket 14 with a second nut member 25. The second nut member 25 is screwed onto the first pivot shaft 20a to engage a middle threaded portion between the head section 20a and the end that is opposite to the head section 20a of the first pivot shaft 20.

The second brake arm 18 is a C-shaped curved member. A quick release mechanism 30 according to the first embodiment is provided on one end of the second brake arm 18. A second shoe mounting section 18a that can be arranged opposite the first shoe mounting section 16a is provided on the other end of the second brake arm 18. A second brake shoe 28b can be fastened to the second shoe mounting section 18a. The second shoe mounting section 18a has an elongated hole that enables a position of the second brake shoe 28b to be adjusted. The second brake arm 18 has a second shaft mounting section 18b through which a second pivot shaft 22 can be passed. The second brake arm 18 is secured to the second pivot shaft 22, which screws into the bracket 14. The first and second brake arms 16 and 18 are spring loaded by a torsion coil spring 41 in a closing direction, i.e., a direction of moving the first brake shoe 28a and the second brake shoe 28b closer together.

The quick release mechanism 30 has an operating lever 32, an inner cable fastening section 34 and a contact part 36. The inner cable fastening section 34 is attached to the operating lever 32. The contact part 36 is provided on the operating lever 32. The operating lever 32 is an example of an operating part. The operating lever 32 pivots between a released position shown in FIG. 3A and a closed position shown in FIG. 3B. The quick release mechanism 30 is configured such that the operating lever 32 can be reliably moved to a closed position when a drive member (e.g., a part of the bicycle drive train) is operated while the operating lever 32 is in a released position.

As shown in the enlarged portion A of FIG. 4, the second brake arm 18 has a first holding groove 18c, a second holding groove 18d and a through hole 18e. The operating lever 32 is pivotally supported in the through hole 18e. The first and second holding grooves 18c and 18d have a flat V-like shape, and are arranged on a perimeter of the through hole 18e such that they intersect each other. The first holding groove 18c is a groove for holding the operating lever 32 in the closed position. The second holding groove 18d is a groove for holding the operating lever 32 in the released position. The operating lever 32 has a lever section 32a and a shaft section 32b that protrudes from a back face of the lever section 32a. The back face of the lever section 32a is provided with a first engaging protrusion 32c and a second engaging protrusion 32d. The first and second engaging protrusions 32c and 32d are provided along the periphery of the shaft section 32b. The first engaging protrusion 32c engages the first holding groove 18c, while the second engaging protrusion 32d engages the second holding groove 18d. The inner cable fastening section 34 serves to fasten an inner cable 12a of the brake cable 12, and is turnably attached to the shaft section 32b of the operating lever 32. The released position of the operating lever 32 is restricted by a circular arc-shaped restricting wall 18g that is formed on one end of the second brake arm 18.

The shaft section 32b protrudes from a back face of the second brake arm 18. A mounting hole 32e is provided in the lever section 32a and the shaft section 32b. The inner cable fastening section 34 passes through the mounting hole 32e. The mounting hole 32e is formed in such a position as to be eccentric with respect to an axial centerline of the shaft section 32b. A flange 42 is attached to the protruding end of the shaft section 32b by the inner cable fastening section 34. A biasing member 44, e.g., a coil compression spring, is installed on an outer circumference of the protruding portion of the shaft section 32b.

The biasing member 44 is installed between the flange 42 and the back face of the second brake arm 18 in a compresses state. The biasing member 44 serves to distribute a force against the operating member 32 toward the released position or the closed position. The released position is a position in which the first and second brake arms 16 and 18 have been moved farther open than the closed position so that a wheel (e.g., a rear wheel 9) can be removed or attached quickly. When the operating lever 32 is pivoted to the released position, the inner cable fastening section 34 and an outer casing stop section 26 draw closer together and the first and second brake arms 16 and 18 open. In the closed position, the contact part 36 separates from a cam surface 48 (explained later). As a result, the cam surface 48 and the contact part 36 do not collide at the closed position.

The inner cable fastening section 34 is turnably mounted in the mounting hole 32e. As shown in FIG. 5, the inner cable fastening section 34 is fastened to the inner cable 12a by pinching the inner cable 12a with a washer 34b that is tightened with a bolt member 34a.

As shown in FIG. 3Aa and the enlarged circled section A of FIG. 4, the contact part 36 protrudes from an outer circumferential surface of the lever section 32a. The contact part 36 is positioned by contacting restricting wall 18g when the operating lever 32 is in the closed position. When the operating lever 32 is in the released position, the operating lever 32 can contact a cam surface 48 provided on a back face of the left crank 8, i.e., on the side of the left crank 8 that faces the frame 2.

Figure 6A:
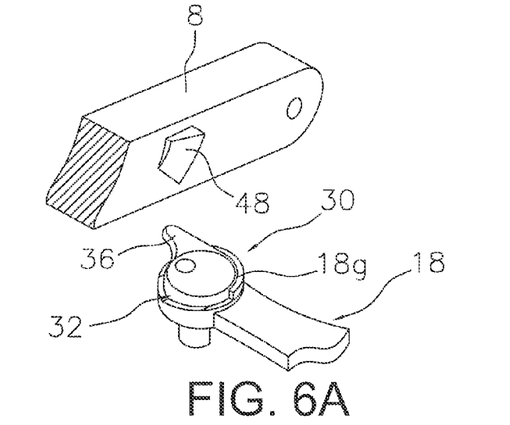
FIG. 6A is a diagrammatic illustration of an initial part of a return operation of the operating part of the quick release mechanism in accordance with the first embodiment.

As shown in FIG. 6A, the cam surface 48 is a curved cam configured to push the contact part 36 smoothly from the released position to the closed position when the left crank 8 rotates in an advancement direction. Specifically, the cam surface 48 is configured to be level with a side face of the left crank 8 that faces the frame 2 on a rotationally downstream side and gradually increase in thickness toward a rotationally upstream side. Additionally, the cam surface 48 is sloped such that its thickness is larger at a radially outward position than t a radially inward position. Thus, if the operating lever 32 is in the released position, the cam surface 48 will push the release lever 32 such that it returns to the closed position.

Figure 6B:
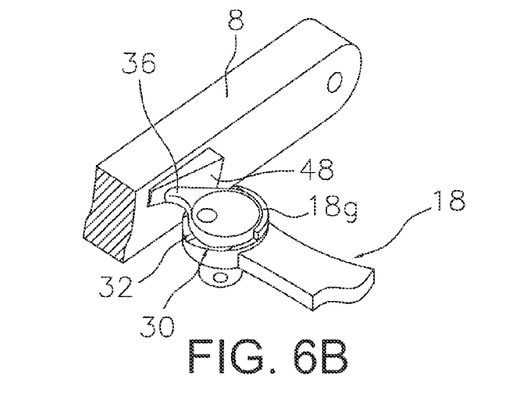
FIG. 6B is a diagrammatic illustration of an intermediate part of the return operation of the operating part of the quick release mechanism that was started in FIG. 6A.
Figure 6C:
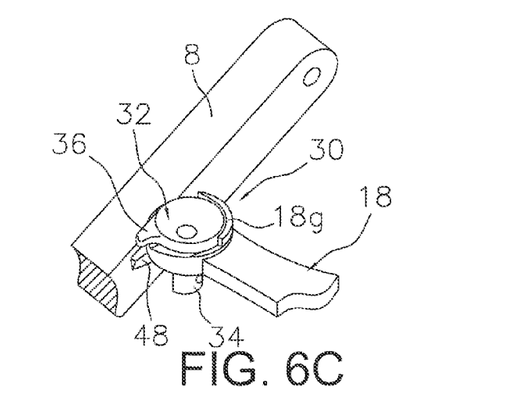
FIG. 6C is a diagrammatic illustration of a final part of the return operation of the operating part of the quick release mechanism that was started in FIG. 6A.

The operation of the quick release mechanism 30 of the of the caliper brake 10 will now be explained with reference to FIGS. 6A to 6C. FIGS. 6A to 6C depict the mechanism as viewed from below the bicycle, as can be recognized by comparing with FIG. 1. Thus, the left crank 8 rotates counterclockwise in an advancement direction about a center indicated by a circle on the left crank 8 in FIGS. 6A to 6C.

Normally, when the bicycle is in use, the operating lever 32 is in the closed position shown in FIG. 3B. When, for example, the rear wheel 9 is replaced during a road race due to a flat tire on the rear wheel 9, a user grasps the contact part 36 and pivots the operating lever 32 from the closed position to the released position. As a result, as shown in FIG. 3A, the first and second brake arms 16 and 18 separate from each other and the rear wheel 9 can be removed easily. From this state, a user normally grasps the contact part 36 and returns the operating lever 32 to the closed position. However, the operating lever 32 is difficult to see when the caliper brake 10 is mounted under the chain stay 3. Consequently, in a race, for example, there are times when a user forgets to return the operating lever 32 to the closed position. When the operating lever 32 is in the released position, the second engaging protrusion 32d is engaged with a second holding groove 18d.

When the operating lever 32 is arranged in the released position as shown in FIG. 6A and the left crank 8 rotates in the forward advancement direction, the cam surface 48 then contacts the contact part 36 as shown in FIG. 6B. As shown in FIG. 6B, when the cam surface 48 contacts the contact part 36, the cam surface 48 pushes the contact part 36 from the released position toward the closed position. As a result, the engaged state of the second holding groove 18d and the second engaging protrusion 32d is released. As a result, the operating lever 32 is now moved towards the advances outward from the first brake arm 16. Then, the first engaging protrusion 32c enters the first holding groove 18c and the biasing member 44 exerts a force against the operation lever 32 in a retraction direction and a direction of engaging the first engaging protrusion 32c with the first holding groove 18c. As a result, as shown in FIG. 6B, the operating lever 32 returns from the releases position to the closed position. When the operating lever 32 is in the closed position, the cam surface 48 does not contact the contact part 36, as explained previously.

Thus, even if a user forgets to return the operating lever 32 (operating part) to the closed position, the operating lever 32 can be reliably set to the closed position. Additionally, when the operating lever 32 is in the released position, the left crank 8 (drive member) contacts the operating lever 32. Consequently, the sound emitted at the time of contact notifies a rider that the operating lever 32 had not been previously returned to the closed position.

Variation of the First Embodiment

Figure 7A:
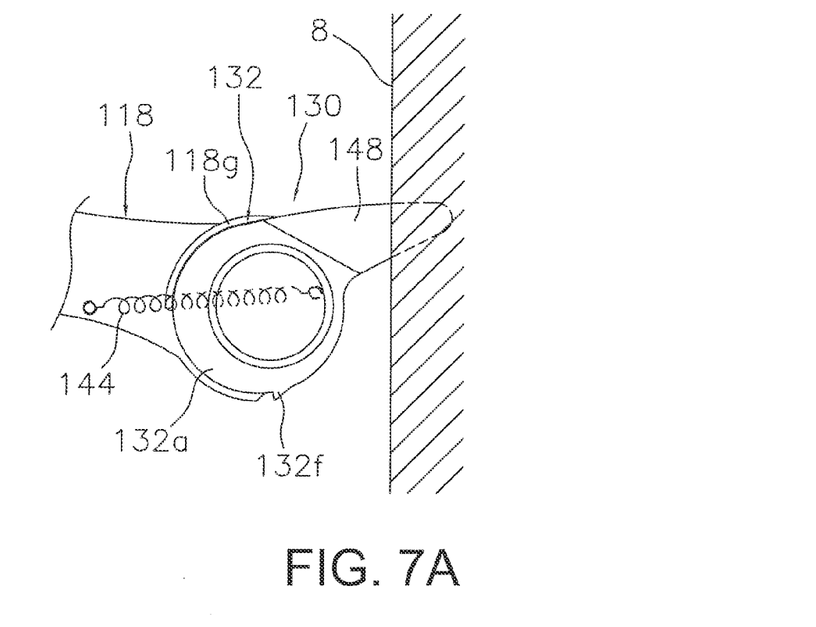
FIG. 7A is an enlarged partial elevational view of a variation of the first embodiment corresponding to FIG. 3A.
Figure 7B:
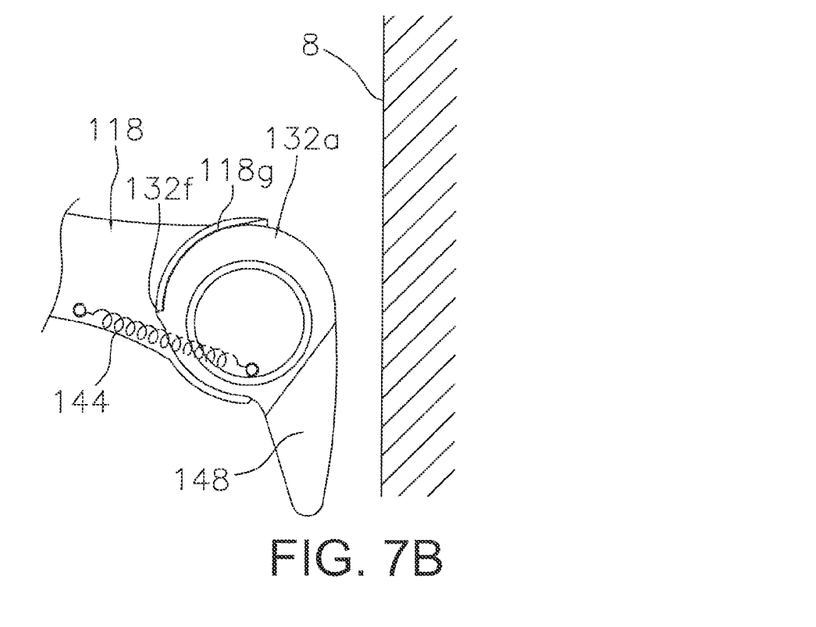
FIG. 7B is an enlarged partial elevational view of a variation of the first embodiment corresponding to FIG. 3B.

In the previously explained embodiment, a cam surface 48 is provided on the left crank 8. In the variation, a cam surface 148 is provided on the contact part 136 of the operating lever 132 of the quick release mechanism 130 as shown in FIGS. 7A and 7B. A biasing member 144 comprises a coil spring with one end hooked onto the operating lever 132 and the other end hooked onto the second brake arm 118. A positioning protrusion 132f that protrudes in a radial direction and is configured to contact the restricting wall 118g is provided on the lever section 132a. The positioning protrusion 132f serves to position the operating lever 132 with respect to the closed position. The biasing member 144 configured to exert a force against the operating lever 132 toward the released position or the closed position in a divided fashion such that the operating lever 132 is positioned at the released position or the closed position.

Similarly to the embodiment, with this variation the operating lever 132 is returned to the closed position when the left crank 8 rotates.

In the previously explained first embodiment and the variation of the first embodiment, the cam surface 48 or the cam surface 148 is configured and arranged such that it pushes the operating lever 132 from the released position toward the closed position when the left crank 8 rotates in a forward advancement direction. However, it is clearly acceptable to configure the cam surface such that slope of the cam is reversed and the operating lever 132 is pushed from the released position toward the closed position when the left crank 8 is rotated in a reverse direction.

It is also acceptable to provide a cam surface that slopes in both directions such that the operating lever 132 is pushed from the released position toward the closed position when the left crank 8 is rotated in either direction, i.e., the forward direction or the reverse direction.

Second Embodiment

Figure 8A:
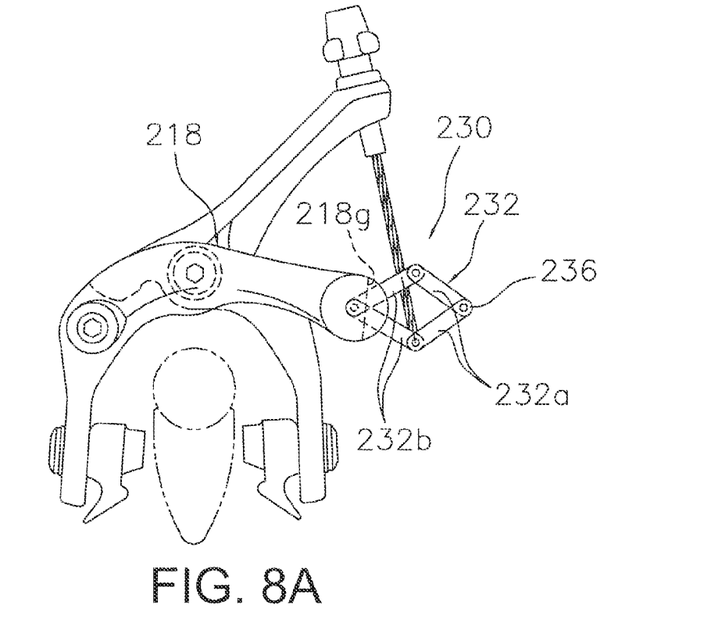
FIG. 8A is a front elevational view, similar to FIG. 3A, of a caliper brake with an operating part in the released position in accordance with a second embodiment.
Figure 8B:
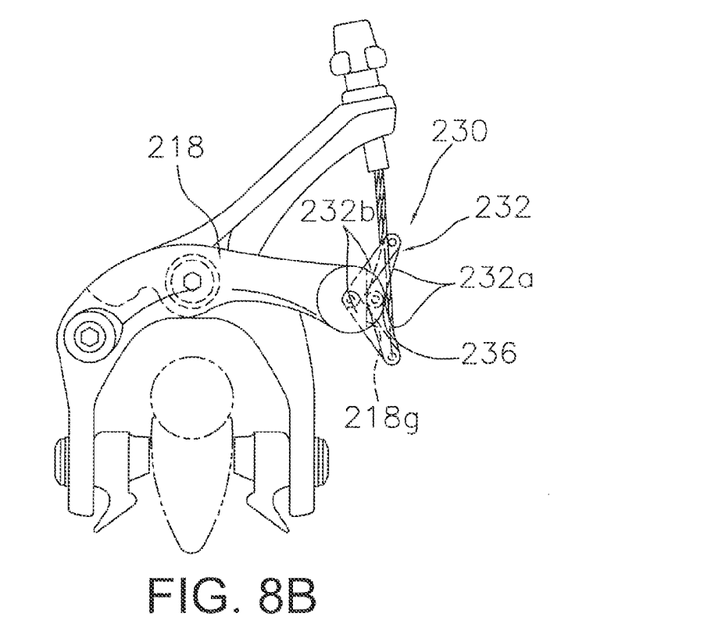
FIG. 8B is a front elevational view, similar to FIG. 3B, of caliper brake with an operating part in the closed position in accordance with the second embodiment.

In the first embodiment, the operating part is the operating lever 32 or 132, but in the second embodiment the operating part is a link mechanism 232 as shown in FIGS. 8A and 8B. The link mechanism 232 is configured to extend and retract between a released position shown in FIG. 8A and a closed position shown in FIG. 8B. The link mechanism 232 is a four-point link mechanism having a pair of first links 232a and a pair of second links 232b. First ends of the first links 232a are rotatably connected together to a back side of one end of the second brake arm 218. A first end of each of the second links 232b is connected to a second end of one of the first links 232a. Second ends of the second links 232b are connected together. The second links 232b are arranged closer to the viewer than the first links 232a in FIGS. 8A and 8B. A restriction wall 218g for restricting the retraction of the second links 232b is formed on a back face of one end of the second brake arm 218. A contact part 236 is provided on the second ends of the second links 232b. Thus, for example, the contact part 236 can contact a cam surface 48 of the left crank 8.

Similarly to the first embodiment, the link mechanism 232 is returned to the closed position when the cam surface 48 pushes the contact part 236. In the second embodiment, the return spring of a brake lever connected to the link mechanism 232 with the brake cable 12 functions as the biasing member.

Third Embodiment

Figure 9:
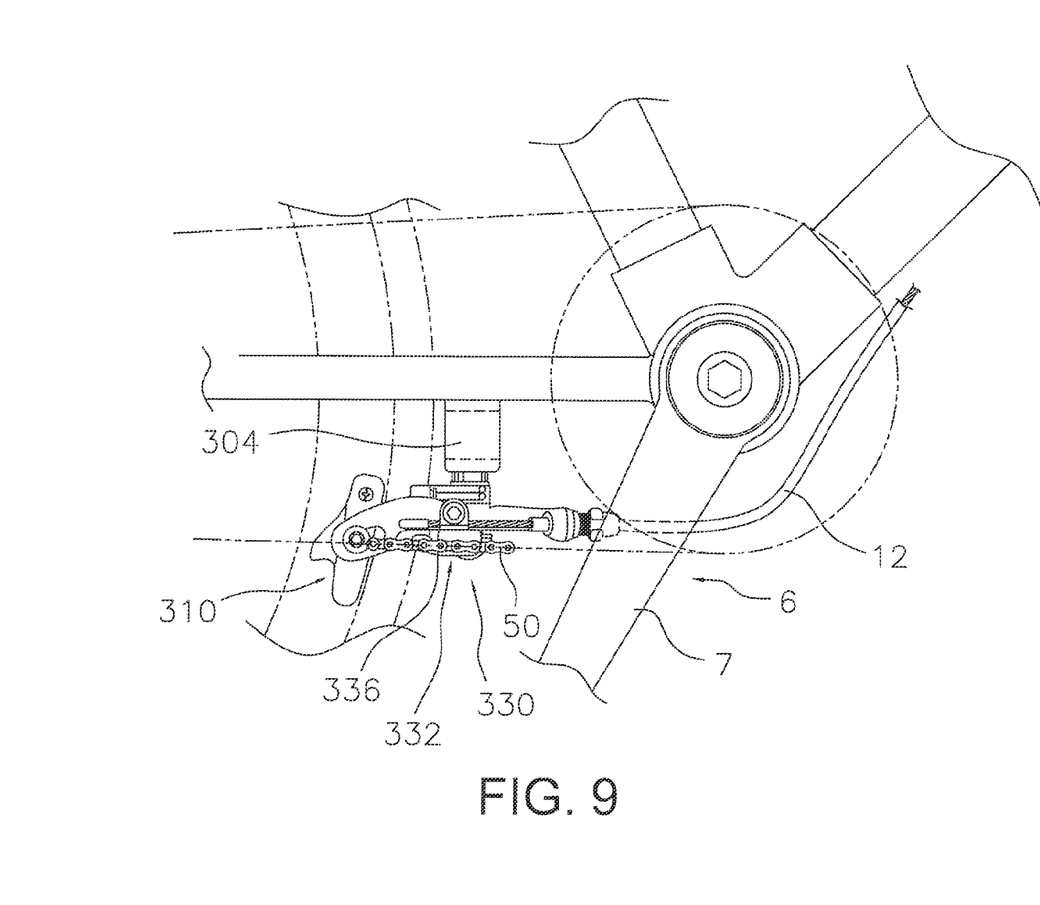
FIG. 9 is a partial side elevational view of a bicycle on which a caliper brake according to a third embodiment shown in an installed position.
Figure 10:
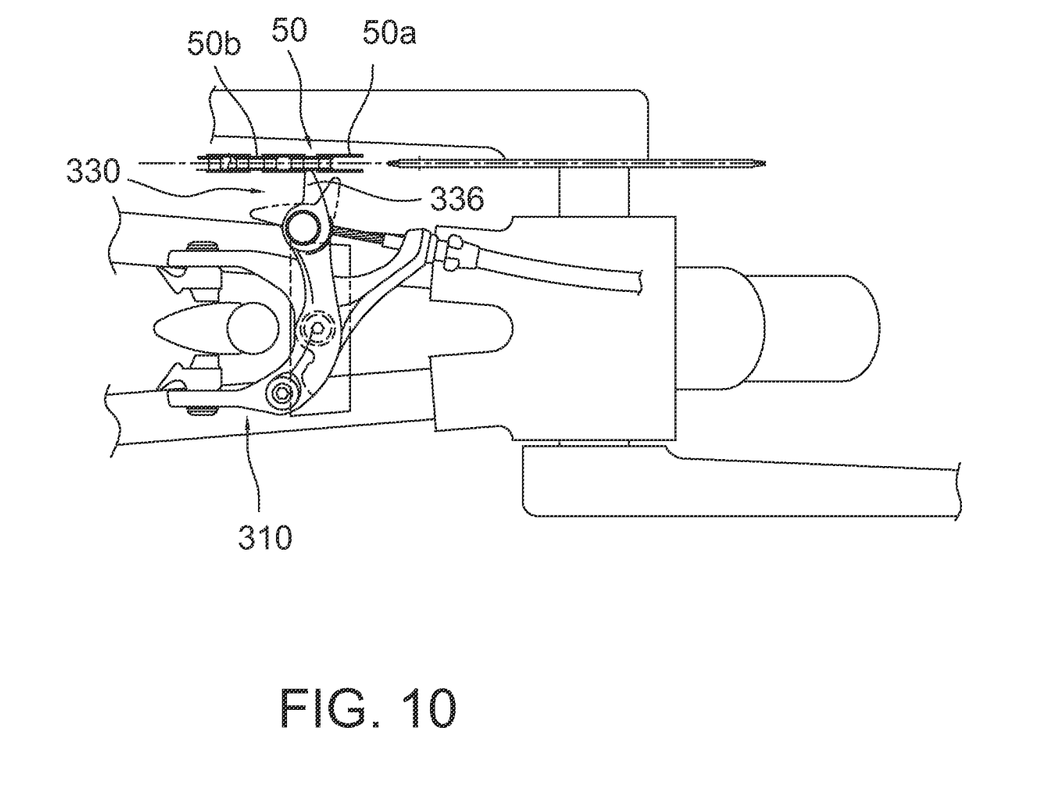
FIG. 10 is a bottom plan view of the portion of the bicycle having the caliper brake as illustrated in FIG. 9 shown in an installed position.

In the previously explained embodiments, the left crank 8 is presented as an example of a drive member. In the third embodiment, a chain 50 is presented as an example of a drive member. FIGS. 9 and 10 show a caliper brake 310 mounted to a coupling member 314. The caliper brake 310 is basically the same as the caliper brake presented in the first embodiment except that it is inverted about a line of symmetry in comparison with the first embodiment.

The quick release mechanism 330 is similar to the first embodiment and has a contact part 336 that can contact a step-like portion between an outer link 50a and an inner link 50b arranged between the outer links 50a of the chain 50 when the contact part 336 is in a released position. The mechanism is configured to be arranged in a closed position when it passes a dead point of the biasing member. It is acceptable to provide a cam surface on all links of the chain.

Other Embodiments

While only selected embodiments have been chosen to illustrate the present invention, it will be apparent to those skilled in the art from this disclosure that various changes and modifications can be made herein without departing from the scope of the invention as defined in the appended claims. Thus, the present invention is not limited to the embodiments described heretofore.

Although the previously explained embodiments present a caliper brake as an example of a bicycle rim brake, the present invention is not limited to a caliper brake. The present invention can be applied to any bicycle brake that is configured to brake a rim of a wheel, e.g., a cantilever brake.

Although in the previously explained embodiments the first brake arm and the second brake arm are configured to pivot about two different axes, the present invention is not limited to such an arrangement. For example, the present invention can be applied to a side caliper brake configured to pivot about one pivot axis.

Although in the previously explained embodiments a crank arm and a chain are presented as examples of a drive member, the present invention is not limited to such drive members. It is acceptable for the drive member to be anything that moves relative to the bicycle brake when the bicycle is moving, e.g., a spoke of a wheel if the bicycle. The present invention can also be applied to a bicycle brake of a front wheel instead of a rear wheel.

Thus, the foregoing descriptions of the embodiments according to the present invention are provided for illustration only, and not for the purpose of limiting the invention as defined by the appended claims and their equivalents.

What is claimed is:

1. A bicycle comprising:
   a frame;
   a drive member movably mounted to the frame for driving the bicycle; and
   a bicycle brake mounted to the frame, the bicycle brake including a quick release mechanism having
      an operating part operatively arranged to be toggled between a closed position and a released position that is separated from the closed position; and
      a contact part provided on the operating part and configured such that the operating part contacts the drive member while the operating part is positioned at the released position,
      the contact part being configured such that after the contact part contacts the drive member due to operation of the drive member, the operating part is then moved from the released position to the closed position.

2. The bicycle as recited in claim 1, wherein
the drive member includes a crank arm that is configured to contact the contact part of the quick release mechanism while the operating part is positioned at the released position.

3. The bicycle as recited in claim 2, wherein
the crank arm includes a cam surface that is positioned relative the contact part of the quick release mechanism such that the cam surface contacts the contact part and moves the operating part from the released position to the closed position as the crank arm rotates relative to the frame.

4. The bicycle as recited in claim 3, wherein
the operating part rotatably disposed on a brake arm of the bicycle brake; and
the quick release mechanism further includes a biasing member that exert a force against the operating part to selectively hold the operating part in the released position and the closed position.

5. The bicycle as recited in claim 2, wherein
the contact part of the quick release mechanism includes a cam surface that is positioned relative the crank arm such that the cam surface contacts the crank arm and moves the operating part from the released position to the closed position as the crank arm rotates relative to the frame.

6. The bicycle as recited in claim 5, wherein
the operating part rotatably disposed on a brake arm of the bicycle brake; and
the quick release mechanism further includes a biasing member that exert a force against the operating part to selectively hold the operating part in the released position and the closed position.

7. The bicycle as recited in claim 2, wherein
the operating part rotatably disposed on a brake arm of the bicycle brake; and
the quick release mechanism further includes a biasing member that exert a force against the operating part to selectively hold the operating part in the released position and the closed position.

8. The bicycle as recited in claim 1, wherein
the drive member includes a chain that is configured to contact the contact part of the quick release mechanism while the operating part is positioned at the released position.

9. The bicycle as recited in claim 8, wherein
the operating part rotatably disposed on a brake arm of the bicycle brake; and
the quick release mechanism further includes a biasing member that exert a force against the operating part to selectively hold the operating part in the released position and the closed position.

10. The bicycle as recited in claim 1, wherein
the operating part rotatably disposed on a brake arm of the bicycle brake; and
the quick release mechanism further includes a biasing member that exerts a force against the operating part to selectively hold the operating part in the released position and the closed position.

\* \* \* \* \*